United States Patent
Nagashima et al.

(10) Patent No.: US 7,452,089 B2
(45) Date of Patent: Nov. 18, 2008

(54) VARIABLE-SHAPE MIRROR AND OPTICAL PICKUP DEVICE THEREWITH

(75) Inventors: Kenji Nagashima, Osaka (JP); Hitoshi Fujii, Osaka (JP); Fuminori Tanaka, Osaka (JP); Susumu Sugiyama, Shiga (JP); Akira Ishii, Shiga (JP); Katsuhiko Tanaka, Shiga (JP); Wataru Kuze, Osaka (JP)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 11/455,939

(22) Filed: Jun. 20, 2006

(65) Prior Publication Data
US 2007/0002473 A1 Jan. 4, 2007

(30) Foreign Application Priority Data
Jun. 20, 2005 (JP) .............................. 2005-179450

(51) Int. Cl.
*G02B 5/06* (2006.01)

(52) U.S. Cl. ....................... 359/846; 359/849
(58) Field of Classification Search ........................ None
See application file for complete search history.

(56) References Cited

U.S. PATENT DOCUMENTS

| | | | | |
|---|---|---|---|---|
| 3,904,274 A | * | 9/1975 | Feinleib et al. ............. 359/295 |
| 4,248,504 A | * | 2/1981 | Albertinetti et al. ......... 359/295 |
| 4,655,563 A | * | 4/1987 | Plante et al. ................. 359/849 |
| 4,657,358 A | * | 4/1987 | Anthony et al. ............. 359/845 |
| 4,725,144 A | * | 2/1988 | Nelson et al. ............... 356/513 |
| 4,934,803 A | * | 6/1990 | Ealey .......................... 359/845 |
| 5,175,465 A | * | 12/1992 | Um et al. ..................... 310/328 |
| 5,357,825 A | * | 10/1994 | Costello et al. ........... 74/490.07 |
| 6,425,671 B1 | * | 7/2002 | Adler et al. ................. 359/846 |
| 2002/0063496 A1 | * | 5/2002 | Forck et al. ................. 310/332 |
| 2003/0095347 A1 | * | 5/2003 | Kobayashi .................. 359/846 |

FOREIGN PATENT DOCUMENTS

| | | | |
|---|---|---|---|
| JP | 05333274 | * | 12/1993 |
| JP | A-05-333274 | | 12/1993 |
| JP | A-2004-109562 | | 4/2004 |

* cited by examiner

*Primary Examiner*—Alessandro Amari
*Assistant Examiner*—Mark Consilvio
(74) *Attorney, Agent, or Firm*—Morgan Lewis & Bockius LLP

(57) ABSTRACT

The variable-shape mirror is provided with a support base and a minor portion that is disposed to face the support base and that has on a side thereof facing away from the support base a minor surface which is irradiated with a light beam. There are also provided piezoelectric elements that are sandwiched between the support base and the mirror portion and that vary the shape of the mirror surface. The piezoelectric elements are bonded, through a thin layer of metal that is separately provided for bonding, to at least one of the support base and the mirror portion. A driving voltage to the piezoelectric elements is supplied through the thin layer of metal.

8 Claims, 4 Drawing Sheets

VARIABLE-SHAPE MIRROR AND OPTICAL PICKUP DEVICE THEREWITH

This application is based on Japanese Patent Application No. 2005-179450 filed on Jun. 20, 2005, the contents of which are hereby incorporated by reference.

BACKGROUND OF THE INVENTION

1. Field of the Invention

The present invention relates to a variable-shape mirror that permits the shape of a mirror surface thereof to be varied, and more particularly relates to a bonding structure between a piezoelectric element and other components constituting the variable-shape mirror. The present invention also relates to an optical pickup device provided with a variable-shape mirror having such a bonding structure.

2. Description of Related Art

When information is read from or written to an optical disc such as a CD (compact disc) or DVD (digital versatile disc) by the use of an optical pickup device, the relationship between the optical axis of the optical pickup device and the disc surface should ideally be perpendicular. In reality, however, when the disc is rotating, their relationship does not always remain perpendicular. As a result, with an optical disc such as a CD or DVD, when its disc surface becomes inclined relative to the optical axis, the optical path of laser light is so bent as to produce coma aberration.

When coma aberration is produced, the spot of laser light shone on the optical disc deviates from the proper position, and, when the coma aberration becomes larger than permitted, inconveniently, it becomes impossible to accurately write or read information. As a means to correct wavefront aberrations such as the coma aberration, there have conventionally been proposed some methods for correcting aberrations by the use of a variable-shape mirror.

For example, JP-A-H05-333274 proposes a method of performing phase control by varying the shape of the mirror itself of a variable-shape mirror by the use of a plurality of actuators. Disadvantageously, however, this method is unsuitable for use in a small component such as an optical pickup device because it does not take wiring and other factors into consideration. Moreover, it is difficult, both technically and in terms of cost, to miniaturize multi-layered piezoelectric elements used as those actuators.

JP-A-2004-109562 proposes that it is advantageous in terms of low voltage and miniaturization to correct wavefront aberration with a wavefront aberration correction mirror having a unimorph or bimorph shape provided with a piezoelectric element. It is also proposed that a mirror and the piezoelectric element are bonded together with adhesive in the variable-shape mirror constructed in this way.

However, when an optical pickup device provided with a variable-shape mirror 101 that varies a mirror surface by exploiting a lateral displacement of a piezoelectric element as shown in FIG. 4 is used to correct wavefront aberration, the following problems will arise. Here, FIG. 4 is an exploded perspective view showing components constituting the variable-shape mirror 101.

When piezoelectric elements 104 formed of PZT (lead zirconate titanate, $Pb(Zr_xTi_{1-x})O_3$) are bonded to both a mirror portion 103 formed of silicon and a support base 102 formed of glass, heat bonding will result in an insufficient bonding strength in the bonding portions due to different physical properties. In this case, when a mirror surface of the mirror portion 103 is varied by driving the piezoelectric elements 104 as shown in FIG. 5, bonding portions 105a between the piezoelectric elements 104 and the mirror portion 103, and bonding portions 105b between the piezoelectric elements 104 and the support base 102 are placed under load. Here, FIG. 5 is a sectional view as cut along line b-b shown in FIG. 4, showing a state in which the left-hand and right-hand piezoelectric elements 104 expand.

This increases, when bonding strength in the bonding portions is insufficient, the possibility that the bonding between the piezoelectric elements 104 and the mirror portion 103 or the bonding between the piezoelectric elements 104 and the support base 102 is broken when the piezoelectric element 104 is driven, reducing the reliability of the variable-shape mirror in terms of mechanical strength. Moreover, as the amount of expansion and contraction of the piezoelectric elements 4 is increased, the load placed on the bonding portions 105a and 105b is increased. This makes it impossible to increase the amount of expansion and contraction of the piezoelectric elements 104, thereby narrowing the aberration correction range.

For this reason, as proposed in JP-A-2004-109562, an adhesive can be used between the mirror portion 103 and the piezoelectric elements 104 to increase the bonding strength between them. In this case, however, the following problem will arise. When the mirror portion 103 is formed of silicon, its electrical conductivity eliminates the need to expressly form an electrode. However, when an adhesive is used between the mirror portion 103 and the piezoelectric elements 104, electrical conduction between the mirror portion 103 and the piezoelectric elements 104 is blocked. This makes it necessary to expressly form an electrode portion. That is, the use of an adhesive complicates the construction of the variable-shape mirror, and thus inconveniently increases the number of components.

SUMMARY OF THE INVENTION

It is an object of the present invention to provide a variable-shape mirror that enhances the bonding strength between piezoelectric elements and a component that is subjected to the action of the piezoelectric elements with no increase in the number of components, and that properly corrects aberrations. It is still another object of the present invention to provide an optical pickup device that is provided with this variable-shape mirror.

To achieve the above objects, according to one aspect of the present invention, a variable-shape mirror is provided with: a support base; a mirror portion that is disposed to face the support base and that has, on a side thereof facing away from the support base, a mirror surface which is irradiated with a light beam; and piezoelectric elements that are sandwiched between the support base and the mirror portion and that vary the shape of the mirror surface. Here, the piezoelectric elements are bonded, by means of a thin layer of metal, to at least one of the support base and the mirror portion by the application of heat and pressure.

With this structure, since the strength in the bonding portions between the piezoelectric elements and the support base or the mirror portion is increased by means of a metal layer laid in between, it is possible to provide a highly reliable variable-shape mirror without using an adhesive in the bonding portions. Moreover, since a thin layer of metal used for increasing the bonding strength has electrical conductivity, there is no need to expressly form an electrode on the mirror portion or the support base. This helps simplify the wiring and reduce the number of components.

In addition, the piezoelectric elements are bonded, by means of a thin layer of metal, to projections formed in the support base by the application of heat and pressure. Alternatively, the piezoelectric elements are bonded, by means of a thin layer of metal, to projections formed in the mirror portion by the application of heat and pressure. Alternatively, the piezoelectric elements are bonded, by means of a thin layer of metal, to projections formed in both the support base and the mirror portion by the application of heat and pressure. This makes it possible to omit the process of forming a mask on the components when a thin layer of metal is formed on the projections, and thereby makes the manufacturing process easier.

Furthermore, the thin layer of metal is a thin layer of Au, and is exposed to heat and pressure at a temperature between 400° C. and 500° C. inclusive. This ensures secure bonding without using an adhesive.

According to another aspect of the present invention, an optical pickup device is provided with the variable-shape mirror structured as described above.

DETAILED DESCRIPTION OF PREFERRED EMBODIMENTS

Figure 1A:
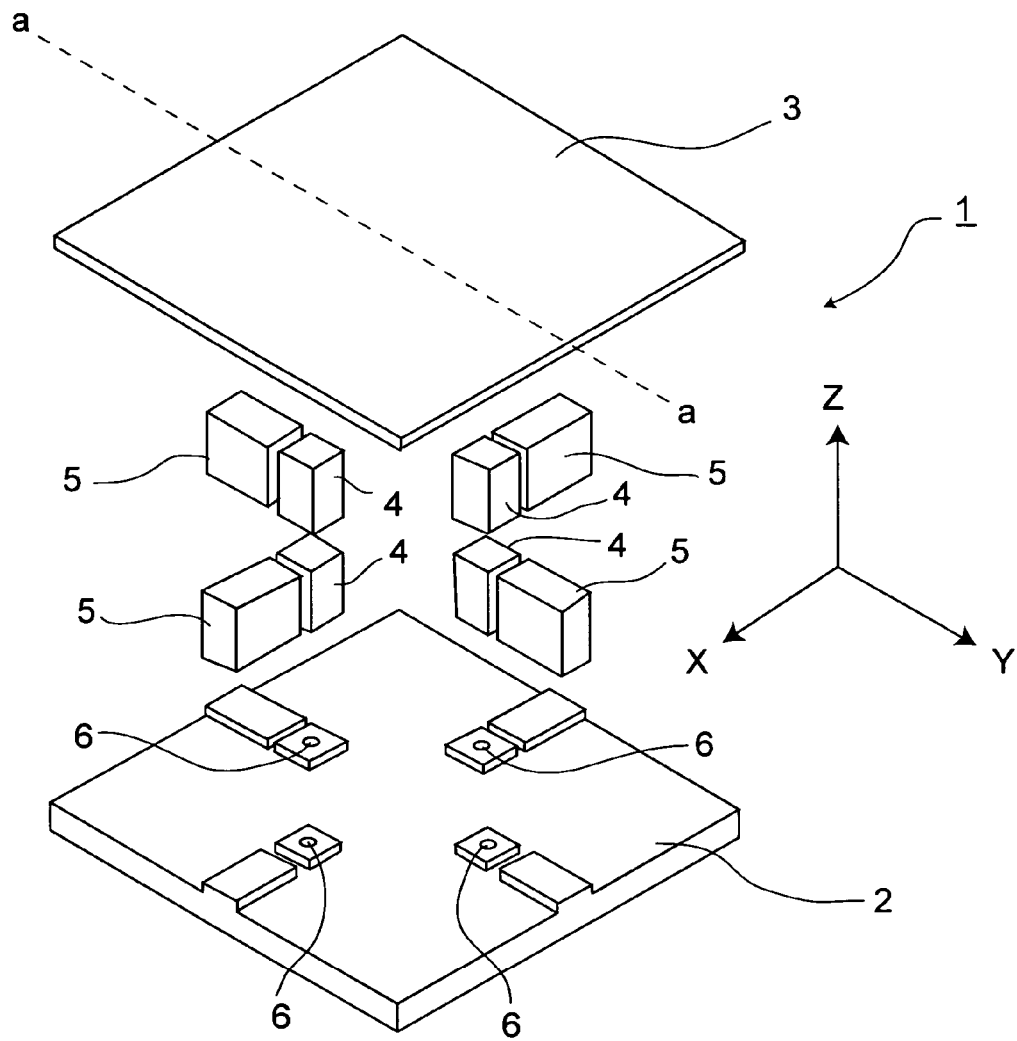
FIG. 1A is an exploded perspective view showing components constituting a variable-shape mirror embodying the present invention.

Hereinafter, embodiments of the present invention will be described with reference to the accompanying drawings. It should be understood that the embodiments described below are merely examples, and are therefore not meant to limit in any way the manner in which the present invention can be carried. It should also be understood that, in the drawings, the sizes and thicknesses of the components, the amount of shape variation that occurs when the shape is varied, etc. are exaggerated for the purpose of easy understanding, and therefore these dimensions are different from those actually observed.

Figure 1B:
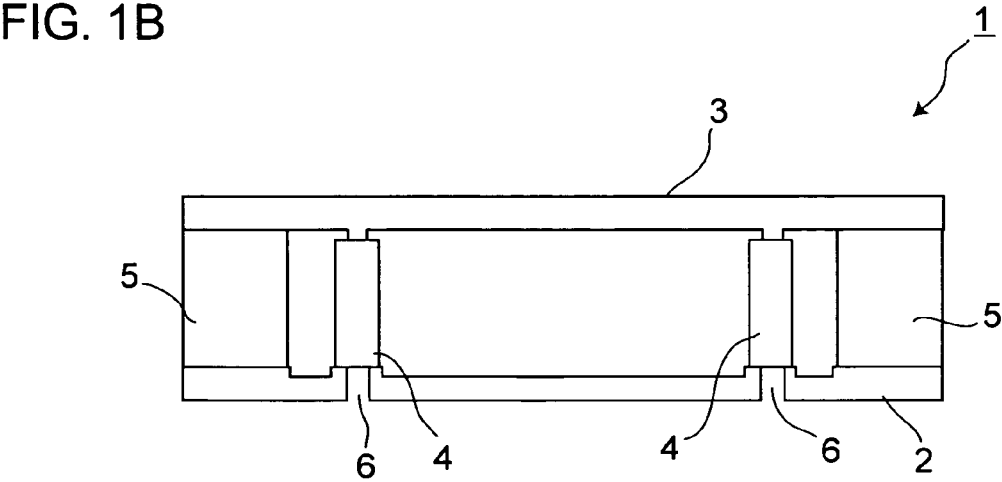
FIG. 1B is a sectional view as cut along line a-a shown in FIG. 1A.

FIG. 1A is an exploded perspective view showing components constituting a variable-shape mirror 1 embodying the present invention, and FIG. 1B is a sectional view as cut along line a-a shown in FIG. 1A.

The variable-shape mirror 1 of the present invention is built as an aberration correcting mirror that varies the shape of the mirror surface formed on the top side of a mirror portion 3 by exploiting the vertical displacement of piezoelectric elements 4. The piezoelectric elements 4 and fixed portions 5 are fitted to a support base 2. The support base 2 is formed of, for example, an insulating material such as glass or ceramic. The support base 2 has electrode holes 6 formed therein through which a voltage is fed to the piezoelectric elements 4.

The mirror portion 3 reflects a light beam emitted from a light source. The mirror portion 3 is formed of, preferably, a material that is rigid and that is electrically conductive so as to be able to feed a voltage to the piezoelectric elements 4. Examples of such a material include silicon and metals such as aluminum and iron. The mirror portion 3 may be formed of an insulating material such as glass, though it then does not offer electrical conductivity. In a case where the mirror portion 3 is formed of an insulating material such as glass, to achieve electrical conduction to the piezoelectric elements 4, it is necessary, for example, to form an electrode pattern on the side of the mirror portion 3 opposite to the mirror surface thereof.

The mirror portion 3 may be formed of a single material. Alternatively, it is also possible to form a base portion of the mirror portion 3 with silicon and then coat the top side thereof by laying a coating of aluminum or the like to form a mirror surface. It is also possible to form a plurality of layers on the base portion.

As shown in FIG. 1A, the piezoelectric elements 4 are sandwiched between the support base 2 and the mirror portion 3, and four of them are arranged symmetrically on the support base 2 in cross-shaped directions. The piezoelectric element 4 expands or contracts according to the direction of a voltage applied thereto. Used as an electrode that feeds a voltage to the piezoelectric elements 4 are, for example, a common electrode that is an electrically conductive mirror portion 3, and individual electrodes patterned on the surface of the support base 2. The piezoelectric elements 4 are formed of a piezoelectric ceramic such as PZT, for example; these, however, may be formed of any other material.

In this embodiment, the piezoelectric elements 4 are rectangular-column-shaped; these are not limited to this particular shape, but may be modified within the objects of the present invention. For example, the piezoelectric elements 4 may be circular-column-shaped, or may be formed to have projections in the parts where the piezoelectric elements 4 make contact with the mirror portion 3 or the support base 2. There may be provided any number of piezoelectric elements 4 in any arrangement other than specifically described in this embodiment. However, to vary the shape of the mirror surface of the mirror portion 3 uniformly at different positions, it is preferable that a plurality of piezoelectric elements 4 be provided symmetrically; when the size of the mirror portion 3 and other factors are taken into consideration, it is preferable that four piezoelectric elements 4 be arranged symmetrically in cross-shaped directions. It is still more preferable that the piezoelectric elements 4 be arranged symmetrically about an axis passing through the center of the mirror surface of the mirror portion 3 as seen in a plan view. In a case where a plurality of piezoelectric elements 4 are provided, it is preferable to adjust the heights of the piezoelectric elements 4 individually so as to prevent deformation from developing on the mirror surface of the mirror portion 3.

As shown in FIGS. 1A and 1B, the fixed portions 5 are sandwiched between the support base 2 and the mirror portion 3, and are disposed outside the piezoelectric elements 4 arranged symmetrically in cross-shaped directions as seen in a plan view. Furthermore, the fixed portions 5 are, at the top faces thereof, bonded to the mirror portion 3. In this embodiment, the fixed portions 5 are separated from the support base 2; alternatively, the support base 2 and the fixed portions 5 may be formed integrally, or may be given any other shapes or otherwise modified within the objects of the present invention. It is preferable that the heights of the individual fixed portions 5 be made equal to prevent deformation on the mirror surface of the mirror portion 3, and it is also preferable that the relationship between the heights of the fixed portions 5 and the piezoelectric elements 4 be so adjusted as not to produce deformation.

In this embodiment, as shown in FIG. 1, the variable-shape mirror 1 as a whole is given the shape of a rectangular parallelepiped; its shape, however, is not limited to this particular shape, but may be modified within the objects of the present invention. For example, the support base 2, the mirror portion 3, or any other components may be formed circular, and the support base 2 may be formed larger than the mirror portion 3.

Figure 2:
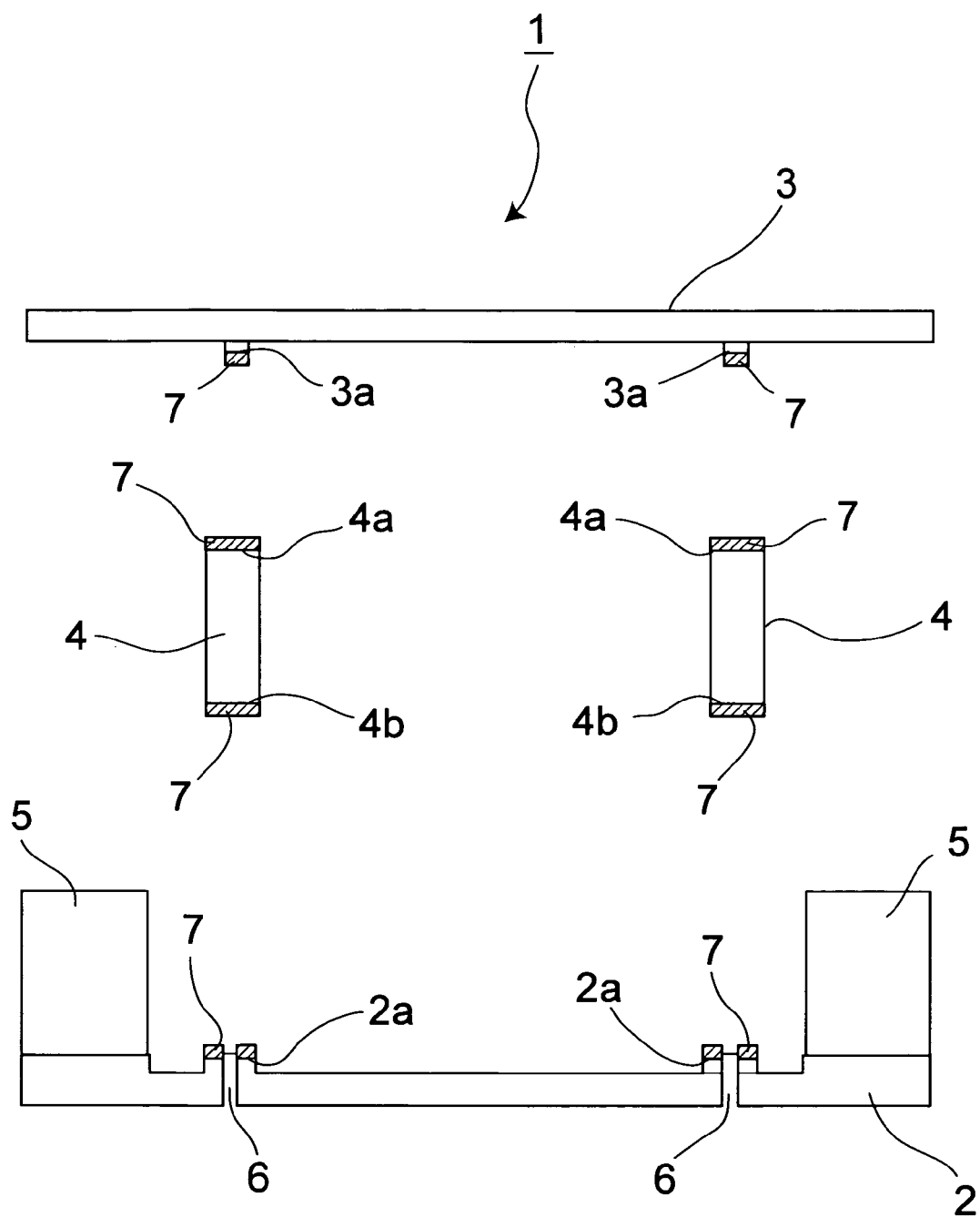
FIG. 2 is sectional view showing how the piezoelectric elements, the mirror portion, and the support base of the variable-shape mirror embodying the present invention are bonded together.

Next, the construction according to the present invention with which the bonding strength between the piezoelectric elements 4 and the mirror portion 3 and between the piezoelectric elements 4 and the support base 2 is enhanced will be described with reference to FIG. 2. FIG. 2 is a sectional view of FIG. 1B, showing a state before the piezoelectric elements 4 and the mirror portion 3 are bonded together and the piezoelectric elements 4 and the support base 2 are bonded together.

For example, in this embodiment, a thin layer 7 of Au is formed on top faces 4a and bottom faces 4b of the piezoelectric elements 4 formed of PZT. Moreover, a thin layer 7 of Au is formed on bottom faces 3a of the mirror portion 3 formed of silicon, and is formed on top faces 2a of the support base 2 formed of glass. That is, before bonding portions are bonded together, the composition of the bonding portion between the mirror portion 3 and the piezoelectric elements 4 is silicon-Au-PZT; the composition of the bonding portion between the piezoelectric elements 4 and the support base 2 is PZT-Au-glass.

The thin layer 7 of Au may be formed in any manner. For example, the thin layer 7 of Au is formed by vapor deposition or spattering.

These components are bonded together at their bonding faces where the thin layer 7 of Au is formed. At this time, these components are bonded together under heat and pressure, preferably, at a temperature between 400° C. and 500° C. inclusive. For example, as shown in Table 1, compared to a case where these components are bonded together under heat and pressure at a temperature of 450° C., the higher the temperature becomes, the lower the bonding strength becomes. On the other hand, a temperature of lower than 370° C. results in insufficient bonding. A tensile strength tester (Micro Tester Model 5848 of INSTRON Corp.) was used to measure the bonding strength.

TABLE 1

| Temperature (° C.) | Bonding strength (MPa) |
|---|---|
| 450 | 22.5 |
| 500 | 20.4 |
| 550 | 19.7 |

In this embodiment, the support base 2 is formed of glass, the mirror portion 3 is formed of silicon, the piezoelectric elements 4 are formed of PZT, and the metal that is vapor-deposited or otherwise on the bonding faces of these components is formed of Au; these are not limited to these particular materials, but may be modified as long as the strength in the bonding portions can be increased, which is one object of the present invention. That is, the metal that is vapor-deposited or otherwise onto the support base 2, the mirror portion 3, and the piezoelectric elements 4 is not limited to Au, but may be, for example, Pt, Pd, or an alloy of, for example, Au and Pd. Moreover, the mirror portion 3 may be formed of any material other than silicon; for example, it may be formed of Al. Furthermore, the piezoelectric elements 4 may be formed of, for example, a piezoelectric ceramic other than PZT.

Although, this embodiment deals with a case where the thin layer 7 of metal is formed on both bonding faces of two mutually facing components constituting the bonding portions, such as the bottom of the mirror portion 3 and the top faces 4a of the piezoelectric elements 4, there is no need to form the thin layer 7 of metal on both bonding faces of two mutually facing components. The thin layer 7 of metal may be formed on one of the bonding faces. Furthermore, in this embodiment, the thin layer 7 of metal is not vapor-deposited or otherwise on bonding faces between the fixed portions 5 and the mirror portion 3. However, to enhance the bonding strength, the thin layer 7 of metal may be vapor-deposited or otherwise on the bonding faces between the fixed portions 5 and the mirror portion 3.

As described in this embodiment, to enhance the bonding strength between the mirror portion 3 and the piezoelectric elements 4 and between the piezoelectric elements 4 and the support base 2, when the thin layer 7 of Au is formed on the bonding faces of these components, the high electrical conductivity of Au eliminates the need to expressly form an electrode to feed a voltage to the piezoelectric elements 4. That is, at the top faces of the piezoelectric elements 4, a silicon surface of the mirror portion 3 serves as a common electrode through Au, and, at the bottom faces of the piezoelectric elements 4, Au vapor-deposited on a glass surface serves as an electrode pattern, thereby making it possible to provide individual electrodes.

In this embodiment, as shown in FIG. 1, the support base 2 and the mirror portion 3 have parts 2a and 3a, respectively, which are projecting parts where the support base 2 and the mirror portion 3 make contact with the piezoelectric elements 4. It should be understood, however, this is not meant to limit in any way their shapes in practice. It is preferable, however, that one or both of the support base 2 and the mirror portion 3 has bonding portions formed as projections. The reason is as follows. For example, in a case where Au is vapor-deposited on the bonding faces of the support base 2 or the mirror portion 3, a mask usually needs to be formed on the parts where no piezoelectric elements 4 are placed so that Au is not vapor-deposited thereon. However, by forming bonding portions as projections as in this embodiment, it becomes possible to vapor-deposit Au without forming a mask. This makes it easy to assemble the variable-shape mirror 1.

Figure 3:
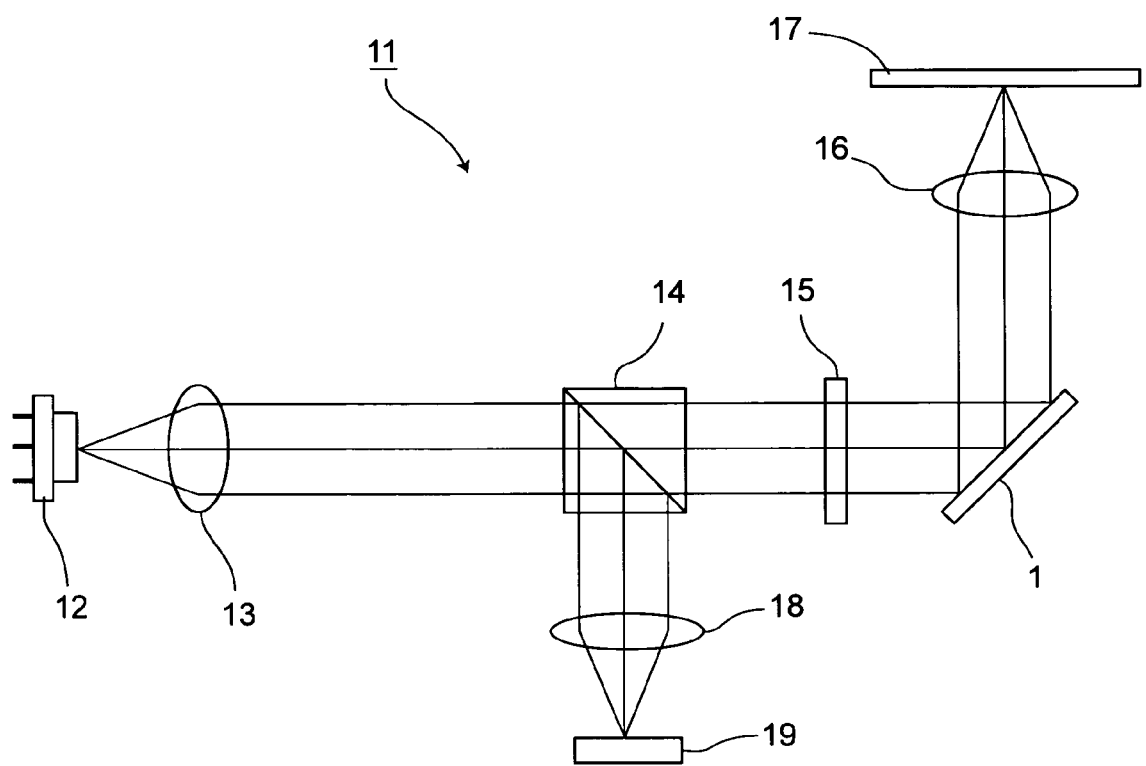
FIG. 3 is a diagram showing an outline of the optical system of an optical pickup device employing a variable-shape mirror embodying the present invention.
Figure 4:
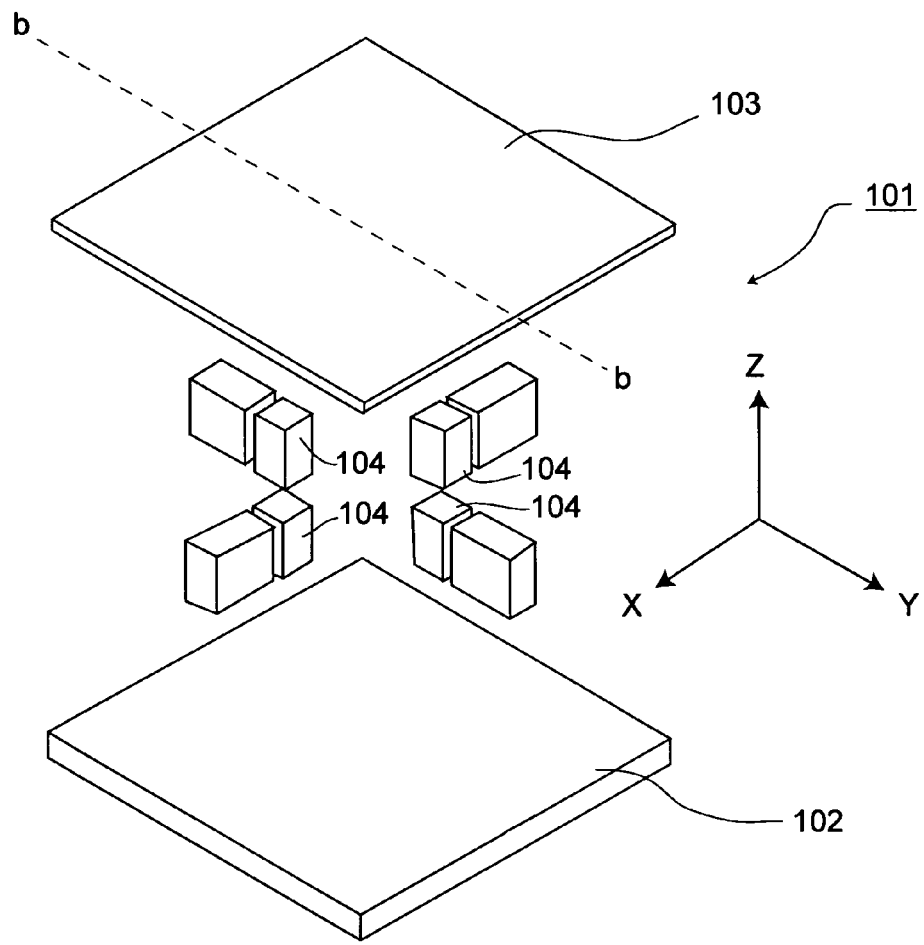
FIG. 4 is an exploded perspective view showing components constituting a conventional variable-shape mirror.
Figure 5:
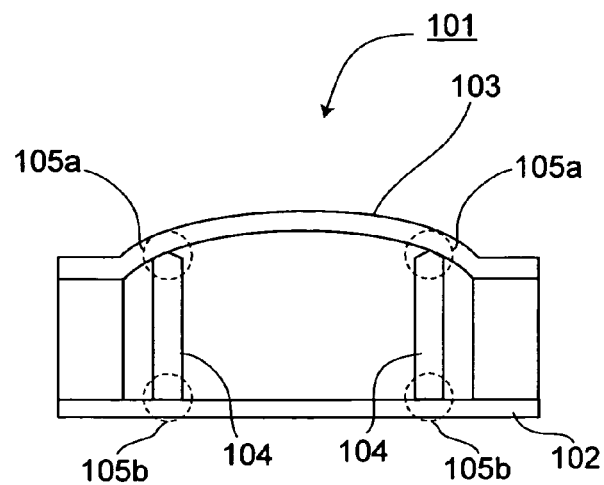
FIG. 5 is a sectional view as cut along line b-b shown in FIG. 4.

Next, as another embodiment of the present invention, an optical pickup device 11 employing a variable-shape mirror according to the present invention will be described. The optical pickup device 11 incorporating the variable-shape mirror 1 according to the present invention includes an optical system constructed, for example, as shown in FIG. 3. The optical system of the optical pickup device 11 may be constructed in any other manner within the objects of the present invention.

The optical pickup device 11 shown in FIG. 3 is provided with a semiconductor laser 12, a collimator lens 13, a beam splitter 14, a variable-shape mirror 1 according to the present invention, a quarter-wave plate 15, an objective lens 16, a condenser lens 18, and a photodetector 19.

The laser light emitted from the semiconductor laser 12 is converted into a parallel beam by the collimator lens 13. This parallel beam is transmitted through the beam splitter 14, is then reflected on the variable-shape mirror 1, then has its polarization state changed by the quarter-wave plate 15, and is then condensed by the objective lens 16 to be focused on an optical disc 17. The laser light reflected from the optical disc 17 passes through the objective lens 16 and the quarter-wave plate 15, is then reflected on the variable-shape mirror 1, is then reflected by the beam splitter 14, and is then condensed by the condenser lens 18 to be directed to the photodetector 19.

In this embodiment, the variable-shape mirror 1 functions, on one hand, as a conventionally used raising mirror. On the other hand, in this optical system, for example, when the optical disc 17 becomes inclined relative to the optical axis of the laser light, as described earlier, coma aberration is produced. To correct this coma aberration, the shape of the mirror surface of the variable-shape mirror 1 is varied; that is, the variable-shape mirror 1 also serves to correct aberrations. Specifically, based on the signal obtained from the photodetector 19, when correction of wavefront aberrations such as coma aberration is necessary, a controller (unillustrated) provided in the optical pickup device 11 feeds a signal to the variable-shape mirror 1 to instruct it to vary the shape of the mirror surface of the mirror portion 3 so as to correct the aberrations.

According to the present invention, a metal layer is formed between the components to be bonded together so as to increase the strength in the bonding portions between the piezoelectric elements and the mirror portion and between the piezoelectric elements and the support base. This makes it possible to provide a variable-shape mirror that offers high reliability in terms of mechanical strength.

Since a thin layer of metal used for increasing the bonding strength has electrical conductivity, there is no need to expressly form an electrode on the mirror portion and the support base to feed a voltage to the piezoelectric elements. This helps simplify the wiring and reduce the number of components.

Bonding portions of one or both of the mirror portion and the support base are so formed as to project therefrom. This makes it possible to simplify the process of vapor-depositing or otherwise a metal layer on these components.

With an optical pickup device according to the present invention employing the variable-shape mirror described above, it is possible to offer high bonding strength and to increase the amount of shape variation of the mirror surface. This helps properly correct aberrations.

What is claimed is:

1. A variable-shape mirror comprising:

a support base;

a mirror portion that is disposed to face the support base and that has, on a side thereof facing away from the support base, a mirror surface which is irradiated with a light beam;

piezoelectric elements that are sandwiched between the support base and the mirror portion and that vary a shape of the mirror surface; and fixed portions, each of which corresponding to one of the piezoelectric elements, sandwiched between the support base and the mirror portion, and disposed closer to an outer edge of the mirror portion than said each of the corresponding piezoelectric elements is, wherein each of the piezoelectric elements has first and second thin layers of metal on both ends thereof, respectively, the mirror portion has first projections provided on a side facing the support base and third thin layers of metal, each of which is provided on a bottom face of each of the first projections, and each of the third thin layers of metal making contact with the first thin layer of metal, the support base has individual electrodes, each of which electrodes comprises a second projection provided on the support base and a fourth thin layer of metal provided on a top face of the second projection, the fourth thin layer of metal making contact with the second thin layer of metal, each of the fixed portions is bonded to the mirror portion without interposing a thin layer of metal therebetween, each of the piezoelectric elements is bonded to the support base through the second and fourth thin layers of metal and the second projection, and bonded to the mirror portion through the first and third thin layers of metal and the first projection, and when a driving voltage is applied to each of the piezoelectric elements through the first, second, third, and fourth thin layers of metal, the piezoelectric elements expand and contract vertically to thereby deform the mirror surface.

2. The variable-shape mirror of claim 1, wherein wherein each of the fixed portions is bonded to the support base without interposing a thin layer of metal therebetween.

3. The variable-shape mirror of claim 2, wherein the first, second, third, and fourth thin layers of metal are thin layers of Au.

4. The variable-shape mirror of claim 1, wherein the support base and the fixed portions are formed integrally.

5. The variable-shape mirror of claim 4, wherein the first, second, third, and fourth thin layers of metal are thin layers of Au.

6. The variable-shape mirror of claim 1, wherein the first, second, third. and fourth thin layers of metal are thin layers of Au.

7. An optical pickup device comprising the variable-shape mirror of claim 1.

8. The variable-shape mirror of claim 1, wherein the fixed portions are bonded only to the mirror portion and are not bonded to the support base.

* * * * *